United States Patent
Sandell et al.

(10) Patent No.: US 10,225,125 B2
(45) Date of Patent: Mar. 5, 2019

(54) CARRIER FREQUENCY OFFSET ESTIMATION USING PRECODED NON-FIXED PILOT SIGNALS

(71) Applicant: Kabushiki Kaisha Toshiba, Tokyo (JP)

(72) Inventors: Magnus Stig Torsten Sandell, Bristol (GB); Filippo Tosato, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/125,025

(22) PCT Filed: Jul. 7, 2014

(86) PCT No.: PCT/GB2014/052063
§ 371 (c)(1),
(2) Date: Sep. 9, 2016

(87) PCT Pub. No.: WO2016/005715
PCT Pub. Date: Jan. 14, 2016

(65) Prior Publication Data
US 2017/0111201 A1    Apr. 20, 2017

(51) Int. Cl.
*H04B 7/06* (2006.01)
*H04L 5/00* (2006.01)
(Continued)

(52) U.S. Cl.
CPC ....... *H04L 27/2657* (2013.01); *H04B 7/0413* (2013.01); *H04B 7/0452* (2013.01);
(Continued)

(58) Field of Classification Search
None
See application file for complete search history.

(56) References Cited

U.S. PATENT DOCUMENTS

| 6,766,341 B1 * | 7/2004 | Trelewicz | ............... G06F 17/14 |
| | | | 708/400 |
| 8,379,752 B2 | 2/2013 | Kleider et al. | |

(Continued)

OTHER PUBLICATIONS

International Search Report issued by the European Patent Office in International Application No. PCT/GB2014/052063, dated Mar. 4, 2015 (2 pages).

(Continued)

*Primary Examiner* — Alpus Hsu
*Assistant Examiner* — Camquyen Thai
(74) *Attorney, Agent, or Firm* — Finnegan, Henderson, Farabow, Garrett & Dunner, L.L.P.

(57) ABSTRACT

A method of selecting a carrier frequency offset tracking pilot signal in an access point of a wireless network is disclosed. The wireless network includes the access point and a plurality of terminals. The method includes receiving, at a plurality of antennas of the access point, signals from each of the plurality of terminals; estimating, from the received signals, a spatial channel signature for each of the plurality of terminals; selecting, for each terminal of the plurality of terminals, using the spatial channel signatures, a carrier frequency offset tracking pilot signal for that terminal from a plurality of pre-coded pilot signals; and transmitting an indication of the selected carrier frequency offset tracking pilot signals to the respective terminal.

11 Claims, 5 Drawing Sheets

(51) Int. Cl.
 *H04L 25/02* (2006.01)
 *H04L 25/03* (2006.01)
 *H04L 27/26* (2006.01)
 *H04W 88/08* (2009.01)
 *H04B 7/0413* (2017.01)
 *H04B 7/0452* (2017.01)
 *H04B 7/0456* (2017.01)

(52) U.S. Cl.
 CPC ......... *H04B 7/0456* (2013.01); *H04B 7/0617* (2013.01); *H04B 7/0697* (2013.01); *H04L 5/0025* (2013.01); *H04L 5/0048* (2013.01); *H04L 25/0204* (2013.01); *H04L 25/03898* (2013.01); *H04W 88/08* (2013.01)

(56) References Cited

U.S. PATENT DOCUMENTS

| | | | |
|---|---|---|---|
| 2004/0110510 A1* | 6/2004 | Jeon | H04L 1/20 455/450 |
| 2005/0041693 A1* | 2/2005 | Priotti | H04B 7/02 370/503 |
| 2005/0064832 A1* | 3/2005 | Kogawa | H04B 7/0602 455/168.1 |
| 2005/0123070 A1* | 6/2005 | Sheen | H04L 7/0054 375/316 |
| 2006/0171488 A1* | 8/2006 | Rosenlof | H04L 27/2657 375/340 |
| 2007/0004337 A1 | 1/2007 | Biswas et al. | |
| 2007/0248196 A1* | 10/2007 | Nakao | H04B 7/084 375/344 |
| 2010/0157861 A1* | 6/2010 | Na | H04B 7/0452 370/310 |
| 2010/0298003 A1* | 11/2010 | Kim | H04B 7/0452 455/450 |
| 2010/0322166 A1* | 12/2010 | Sampath | H04W 72/121 370/329 |
| 2011/0293032 A1 | 12/2011 | Azenkot et al. | |
| 2012/0002750 A1* | 1/2012 | Hooli | H04B 7/0417 375/295 |
| 2014/0269981 A1* | 9/2014 | Asjadi | H04L 27/2601 375/295 |
| 2014/0286455 A1* | 9/2014 | Choi | H04L 5/0048 375/308 |

OTHER PUBLICATIONS

International Preliminary Report on Patentability issued by the European Patent Office in International Application No. PCT/GB2014/052063, dated Jan. 10, 2017 (5 pages).

Fu. Y., et al., "Limited-Feedback Precoding for Closed-Loop Multiuser MIMO OFDM Systems with Frequency Offsets", IEEE Transactions on Wireless Communications, vol. 7, No. 11, pp. 4155-4165, (2008).

Zhang et al., "Maximum-Likelihood CFO Estimation for MIMO/OFDM Uplink Using Superimposed Trainings," IEEE Intl. Conf. Wireless Commun. Netw. Info. Sec. (WCINS) (2010), pp. 247-251.

Aoki et al., "Analysis of Pilots for Residual Frequency Offset Estimation in MIMO OFDM Systems," Transactions on Wireless Communications (Mar. 2009), 8:1128-32.

Forenza et al., "Simplified Spatial Correlation Models for Clustered MIMO Channels With Different Array Configurations," IEEE Transactions on Vehicular Technology (Jul. 2007), 56:1924-34.

Moose, "A Technique for Orthogonal Frequency Division Multiplexing Frequency Offset Correction," IEEE Transactions on Communications (Oct. 1994), 42:2908-14.

Oberli et al., "Maximum Likelihood Tracking Algorithms for MIMO-OFDM," IEEE Communications Society (2004), pp. 2468-72.

Pun et al., "Maximum-Likelihood Synchronization and channel Estimation for OFDMA Uplink Transmissions," IEEE Transactions on Communications (Apr. 2006), 54:726-736.

Sun et al., "Carrier Frequency Offset Tracking in the IEEE 802.16e OFDMA Uplink," IEEE Transactions on Wireless Communications (Dec. 2010), 9.3613-19.

Wu et al., "Carrier Frequency Offset Estimation for Multi-User MIMO OFDM Uplink Using CAZAC Sequences," EURASIP Journal on Wireless Communications and Networking (2011), pp. 1-11.

* cited by examiner

CARRIER FREQUENCY OFFSET ESTIMATION USING PRECODED NON-FIXED PILOT SIGNALS

FIELD

Embodiments described herein relate generally to the selection of pilot symbols for the estimation of residual carrier frequency offset in wireless networks.

BACKGROUND

In multiuser uplink communication, multiple users communicate at the same time with an access point. To increase system capacity and facilitate a more efficient scheduling of users, these users can be separated in space (spatial division multiple access, SDMA) rather than be given a separate time slot (time division multiple access, TDMA) or frequency band (frequency division multiple access, FDMA). By employing multiple antennas at the access point and/or terminals, multiple users can transmit one or more data stream simultaneously, which are separated by multiple-input and multiple-output (MIMO) decoding at the access point. One problem is that each user may have a small carrier frequency offset (CFO) due to variations in the local oscillators, which needs to be estimated and corrected for at the access point.

In Orthogonal frequency-division multiplexing (OFDM) systems, a preamble is usually used to estimate the channel and any CFO. Since there are multiple CFOs (one for each terminal), the training sequence in the preamble must be designed accordingly. However, any residual CFO after estimation and compensation will cause phase rotations to the data symbols in the remaining part of the packet.

BRIEF DESCRIPTION OF THE DRAWINGS

In the following embodiments will be described as non-limiting examples with reference to the accompanying drawings in which.

DETAILED DESCRIPTION

Figure 1:
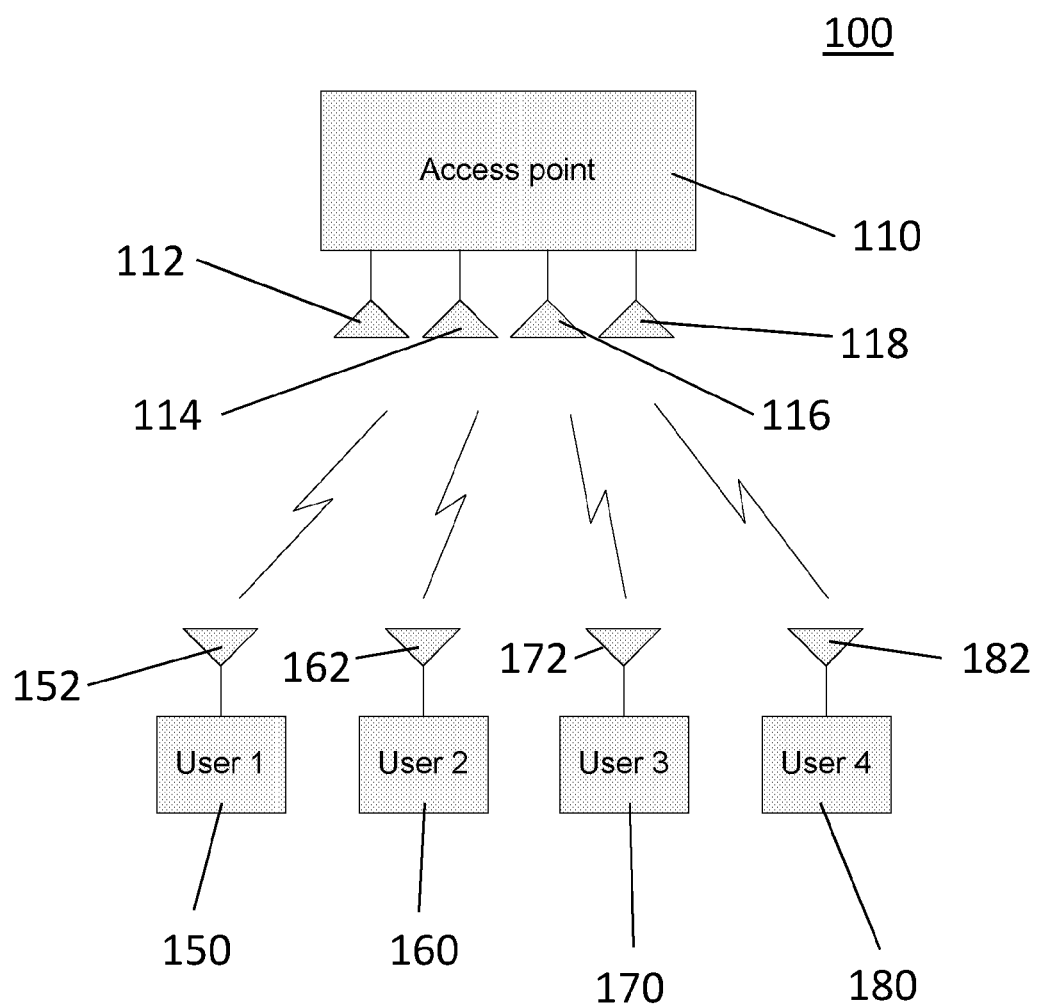
FIG. 1 shows a wireless network according to an embodiment.

In an embodiment a method in an access point of a wireless network is disclosed. The wireless network comprises the access point and a plurality of terminals. The method comprises receiving, at a plurality of antennas of the access point, signals from each of the plurality of terminals; estimating, from the received signals, a spatial channel signature for each of the plurality of terminals; selecting, for each terminal of the plurality of terminals, using the spatial channel signatures, a carrier frequency offset tracking pilot signal for that terminal from a plurality of pre-coded pilot signals; and transmitting an indication of the selected carrier frequency offset tracking pilot signals to the respective terminal.

In an embodiment the carrier frequency offset tracking pilot signal is selected from a codebook and the indication of the selected carrier frequency offset pilot signal comprises a codebook index.

In an embodiment the indication of the selected carrier frequency offset tracking pilot signals indicates weights for a plurality of subcarriers.

In an embodiment selecting a carrier frequency offset pilot signal for each terminal comprises selecting pilot signals which minimise a cost function which is dependent on the spatial channel signatures for each of the plurality of terminals and the pilot signals.

In an embodiment the cost function is the sum over all of the terminals of the errors in the residual carrier frequency offset with a linear estimator.

In an embodiment the cost function is the largest individual error in the carrier frequency offset over all of the terminals.

In an embodiment the method further comprises receiving a data packet signal including the carrier frequency offset tracking pilot signals from the terminals, and estimating a residual carrier frequency offset from the carrier frequency offset tracking pilot signals.

In an embodiment the data packet signal including the carrier frequency offset tracking signals further comprises a data signal, and the method further comprises decoding the data signal using the channel response and the residual carrier frequency offset.

In an embodiment an access point for a wireless network is disclosed. The wireless network comprises the access point and a plurality of terminals. The access point comprises a plurality of antennas configured to receive signals from each of the plurality of terminals; a spatial channel estimator configured to estimate, from the received signals, a spatial channel signature for each of the plurality of terminals; and a pilot selector configured to select, for each terminal of the plurality of terminals, using the spatial channel signatures, a carrier frequency offset tracking pilot signal for that terminal from a plurality of pre-coded pilot signals.

In an embodiment the access point further comprises storage for a codebook, the codebook comprising the plurality of pre-coded pilot signals.

In an embodiment the access point further comprises a residual carrier frequency estimator configured to estimate a residual carrier frequency offset from carrier frequency offset tracking pilot signals received by antennas of the plurality of antennas from the terminals.

In an embodiment a method in a terminal of a wireless network is disclosed. The wireless network comprises an access point and a plurality of terminals. The method comprises receiving, from the access point, an indication of a carrier frequency offset tracking pilot signal; determining a carrier frequency offset tracking pilot signal from the indication; and transmitting a data packet comprising the carrier frequency offset tracking pilot signal to the access point.

In an embodiment the indication of the carrier frequency offset tracking pilot signal comprises a codebook index and determining the carrier frequency offset tracking pilot signal from the indication comprises looking up the carrier frequency offset tracking pilot signal in a codebook.

In an embodiment the indication of the carrier frequency offset tracking pilot signals indicates weights for a plurality of subcarriers and transmitting a data packet comprising the carrier frequency offset tracking pilot signal to the access point comprises weighting the plurality of subcarriers according to the weights.

In an embodiment the method further comprises, further comprises receiving an announcement signal from the access point; and transmitting a sounding signal to the access point in response to the announcement signal.

In an embodiment a terminal for a wireless network is disclosed. The wireless network comprises an access point and a plurality of terminals. The terminal comprises at least one antenna configured to receive signals from the access point and transmit signals to the access point, an indication of a carrier frequency offset tracking pilot signal; and a wireless network interface configured to determine a carrier frequency offset tracking pilot signal from an indication received by the at least one antenna; and to cause the at least one antenna to transmit a data packet comprising the carrier frequency offset tracking pilot signal to the access point.

In an embodiment the terminal further comprises storage for a codebook, wherein the indication of the carrier frequency offset tracking pilot signal comprises a codebook index and the network interface is further operable to determine the carrier frequency offset tracking pilot signal from the indication by looking up the carrier frequency offset tracking pilot signal in a codebook.

FIG. 1 shows a wireless network 100 according to an embodiment. The wireless network 100 comprises an access point 110, a first user terminal 150, a second user terminal 160, a third user terminal 170 and a fourth user terminal 180.

The access point 110 comprises four antennas 112 114 116 and 118. Each of the user terminals comprises one antenna. The first user terminal 150 comprises a first user antenna 152. The second user terminal 160 comprises a second user antenna 162. The third user terminal 170 comprises a third user antenna 172. The fourth user terminal 180 comprises a fourth user antenna 182.

To increase the system capacity of the network 100 and facilitate a more efficient scheduling of the user terminals, the users are separated in space (spatial division multiple access, SDMA). By employing multiple antennas 112 114 116 and 118 at the access point and/or terminals, multiple users can transmit one or more data stream simultaneously, which are separated by multiple-input and multiple-output (MIMO) decoding at the access point 110.

Each user may have a small carrier frequency offset (CFO) due to variations in the local oscillators. This CFO is estimated and corrected for at the access point 110. The estimation of the CFO is described below with reference to FIG. 4.

Figures 2, 3:
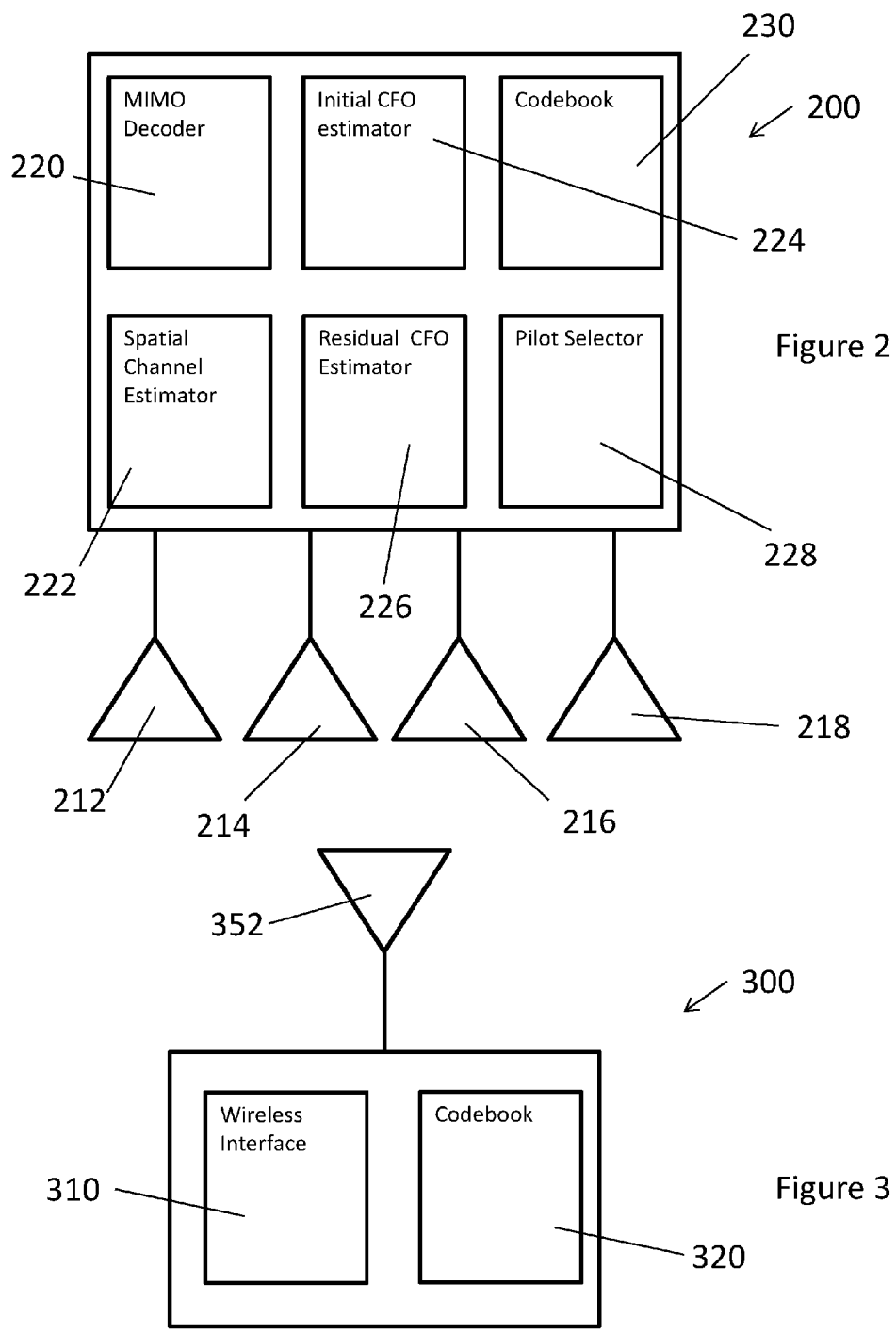
FIG. 2 shows an access point according to an embodiment.
FIG. 3 shows a terminal of a wireless network according to an embodiment.

FIG. 2 shows an access point 200 according to an embodiment. The access point 200 has four antennas 212 214 216 218; and comprises a MIMO decoder 220, a spatial channel estimator 222, an initial CFO estimator 224, a residual CFO estimator 226, a pilot selector 228 and a codebook 230. The spatial channel estimator 222 is operable to estimate spatial channels from pilot sounding signals received by the four antennas. The MIMO decoder 220 is configured to separate signals received at the antennas from different user data streams using spatial decoding. The initial CFO estimator 224 is configured to estimate an initial carrier frequency offset for each user from pilot sounding signals received from the users. The residual CFO estimator 226 is configured to estimate a residual carrier frequency offset from pilot symbols which are transmitted within data packets received by the access point 200. The pilot selector is configured to select pilot symbols for use by user from pilot symbols stored in the codebook 230. The codebook 230 stores a plurality of possible pilot symbols which are each indicated by an index. The pilot selector 228 selects pilot symbols for use by each user based on channel realisations determined by the spatial channel estimator 222.

FIG. 3 shows a user terminal 300 according to an embodiment. The user terminal 300 comprises an antenna 352, a wireless interface 310 and a codebook 320. The wireless interface 310 allows the user terminal 300 to transmit and receive signals via the antenna 352. The codebook 320 stores the possible pilot symbols and indices stored by the codebook 230 of the access point 200.

The elements of the access point 200 and the user terminal 300 may be implemented as computer program modules running on processor or may be implemented as programmed hardware devices or a combination of the two.

Figure 4:
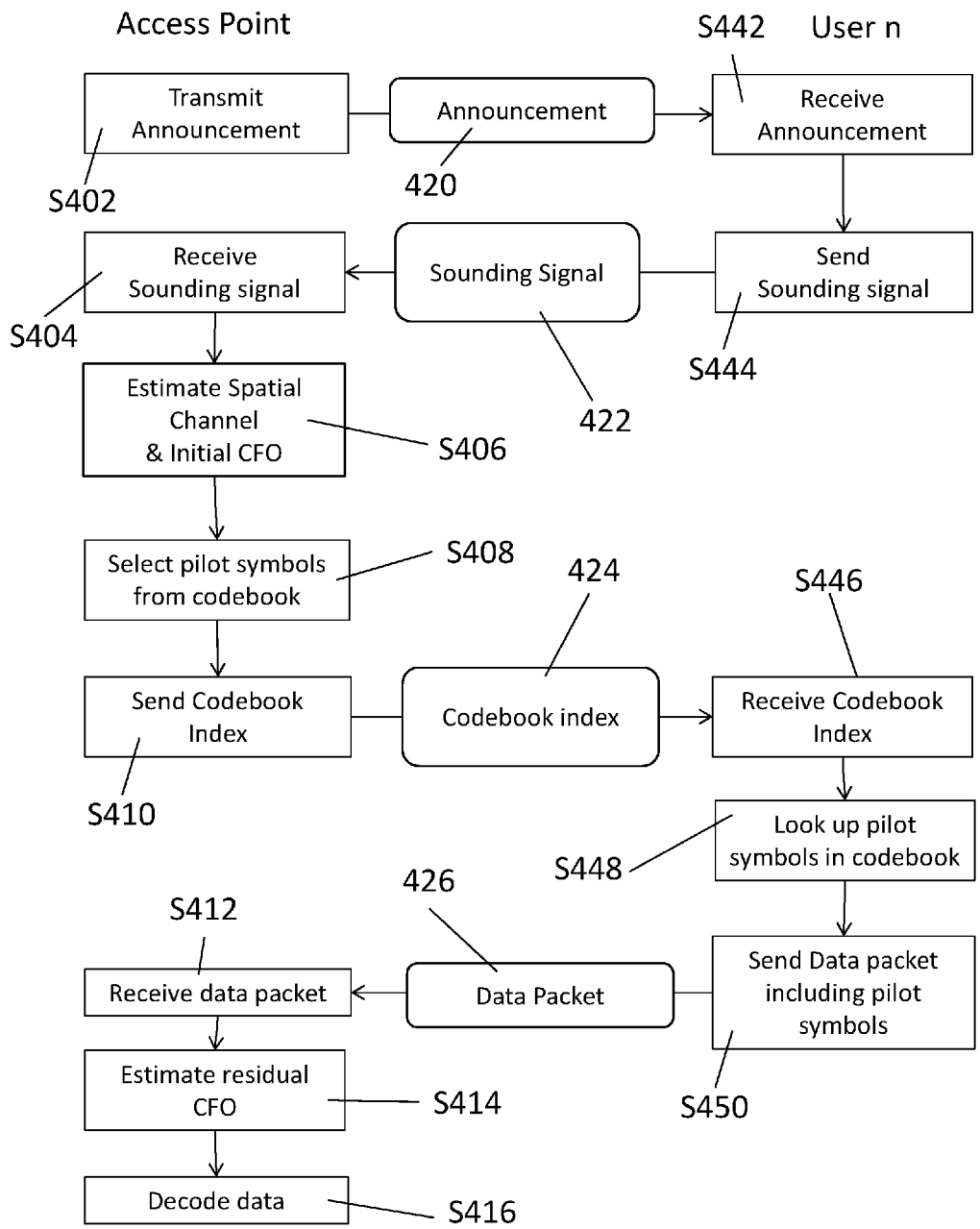
FIG. 4 shows a method of wireless communication according to an embodiment.

FIG. 4 is a flowchart showing the steps carried out in a wireless communication method according to an embodiment. FIG. 4 shows the steps carried out by an access point and a user, for example the access point 200 shown in FIG. 2 and the user terminal 300 shown in FIG. 3. It will be appreciated that the method is carried out for a network with multiple users such as the network 100 shown in FIG. 1.

In step S402, the access point transmits an announcement 420 to all users. The user n receives the announcement 420 in step S442. In response to the announcement 420, in step S444, the user n sends a sounding signal 422 to the access point. The access point receives the sounding signal 422 in step S404.

In step S406, the access point estimates the spatial channel associated with the user n and initial CFO from the sounding signal 422.

In step S408, the access point uses the estimated spatial channel for all users to select pilot symbols from a codebook for the user n. In step S410, the access point sends a codebook index 424 to the user n. The codebook index 424 indicates the pilot symbols selected by the access point for the user n to use.

The user n receives the codebook index 424 in step S446. In step S448, the user n looks up the pilot symbols in the codebook. In step S450, the user n transmits a data packet 426 to the access point. The data packet 426 includes the pilot symbols.

The access point receives the data packet 426 in step S412. In step S414, the access point uses the pilot symbols in the data packet 426 to estimate the residual CFO. In step S416, the access point decodes the data in the data packet 426 using the spatial channel estimate and initial CFO estimate from step S406 and the residual CFO estimated in step S414.

As described above with reference to FIG. 4, the channel and the initial CFO can be estimated using a sounding signal. The effect of the residual CFO is to introduce a phase shift to all data symbols that follow. For a single-user OFDM system, the phase shift is:

$$\phi = 2\pi\left(1 + \frac{N_{cp}}{N_{sub}}\right)\varepsilon$$

where $N_{cp}$ is the length of the cyclic prefix, $N_{sub}$ is the number of subcarriers and $\varepsilon$ is the residual CFO relative to the subcarrier spacing.

Extending this to a multiuser uplink MIMO system with N receive antennas and M single-antenna terminals, the received signal on subcarrier k and antenna n is $$R_{n,k} = \sum_{m=1}^{M} e^{j\phi_m} H_{n,m,k} X_{m,k} + W_{n,k} + V_{n,k}$$

Where $H_{n,m,k}$ are the channel realisations, $X_{m,k}$ is the data transmitted by the mth user on the kth subcarrier, $W_{n,k}$ is intercarrier interference (ICI) caused by the residual CFO and $V_{n,k}$ is the thermal noise. Normally the ICI can be modelled as Gaussian white noise and combined into a single noise term $\tilde{V}_{n,k}$. The individual phase shifts are $$\phi_m = 2\pi\left(1 + \frac{N_{cp}}{N_{sub}}\right)\varepsilon_m$$

and the goal is then to estimate them and compensate for them to avoid a phase rotation of the data symbol and to minimise the ICI.

In a single-user system, where there is only one residual CFO, it is straightforward to use a differential scheme.

In a multiuser system, coherent estimation is more appropriate. One way is to formulate the linear system $$\begin{pmatrix} R_{1,k_1} \\ \vdots \\ R_{1,k_P} \\ \vdots \\ R_{N,k_P} \end{pmatrix} = \begin{pmatrix} H_{1,1,k_1}X_{1,k_1} & \cdots & H_{1,M,k_1}X_{M,k_1} \\ \vdots & \ddots & \vdots \\ H_{1,1,k_P}X_{1,k_P} & \cdots & H_{1,M,k_P}X_{M,k_P} \\ \vdots & \ddots & \vdots \\ H_{N,1,k_P}X_{1,k_P} & \vdots & H_{N,M,k_P}X_{M,k_P} \end{pmatrix} \begin{pmatrix} e^{j\phi_1} \\ \vdots \\ e^{j\phi_M} \end{pmatrix} + \begin{pmatrix} \tilde{V}_{1,k_1} \\ \vdots \\ \tilde{V}_{1,k_P} \\ \vdots \\ \tilde{V}_{N,k_P} \end{pmatrix}$$

$$r = Ay + \tilde{v}$$
$$r \in \mathbb{C}^{PN \times 1}, A \in \mathbb{C}^{PN \times M}, y \in \mathbb{C}^{M \times 1}, \tilde{v} \in \mathbb{C}^{PN \times 1}$$

where $k_1, \ldots, k_p$ are the pilot subcarriers on which known symbols are transmitted. The residual CFOs $\varepsilon_m$ can now be estimated using, e.g., a maximum-likelihood method; for a simpler implementation, it is also possible to do a least-squares/minimum mean-squared error estimation of the terms $e^{j\phi_m}$.

Figure 5:
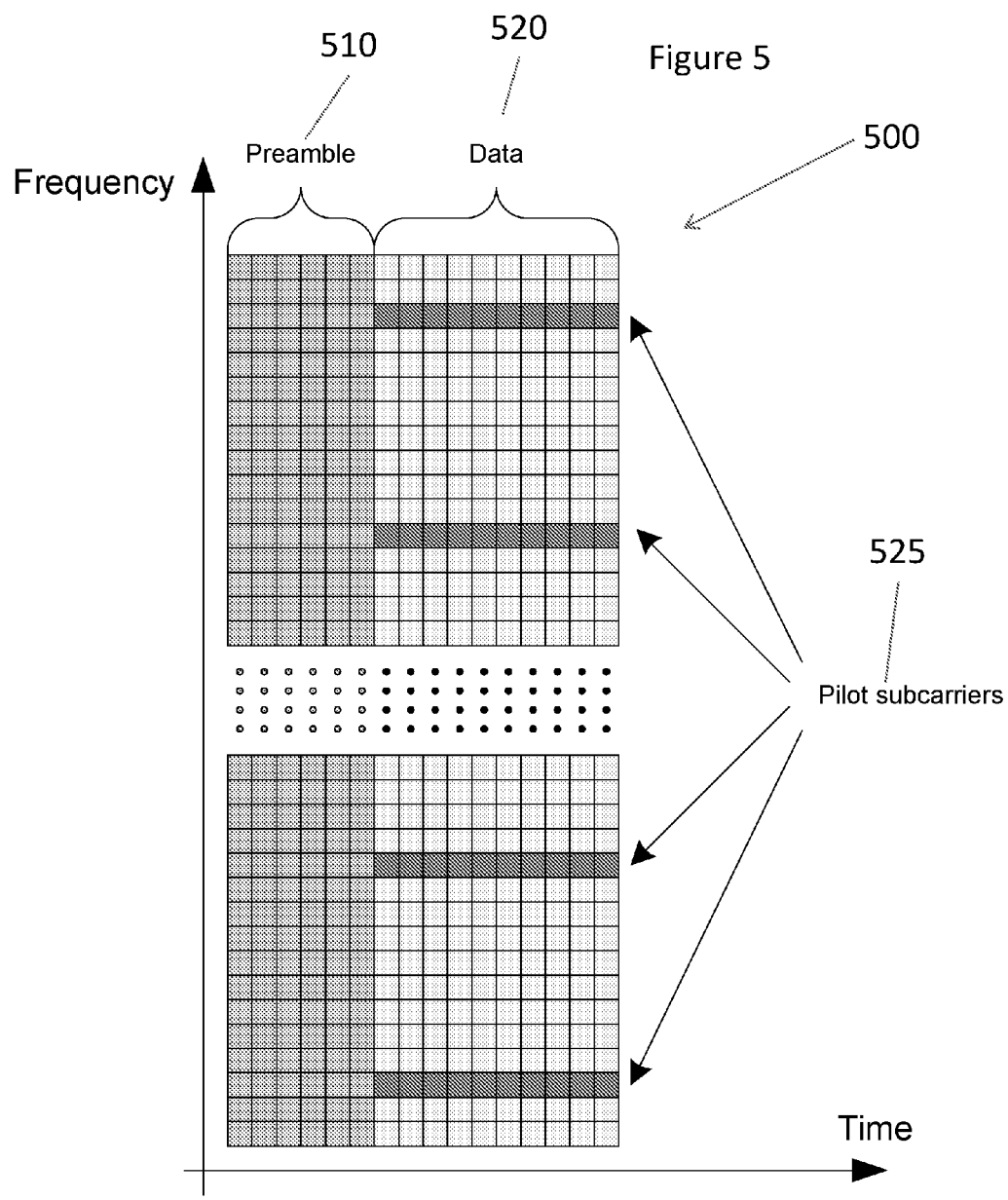
FIG. 5 shows pilot subcarriers in an embodiment.

FIG. 5 shows pilot subcarriers included in data packets according to an embodiment. The packets 500 shown in FIG. 5 are transmitted from users to the access point. The packets 500 include a preamble 510 and a data portion 520. The data portion 520 includes pilot subcarriers 525. The pilot subcarriers 525 are selected according to the method described above so that the access point can accurately determine the residual CFO from the pilot subcarriers 525.

In an embodiment, the access point sends an indication of a pre-coding vector to each of the users. The pre-coding vector specifies a set of weights to be applied to each of the pilot subcarriers 525 to reduce interference between pilots of different users.

Note that in the above embodiments, we assumed one antenna per terminal. If the terminals have more than that and possibly employ beamforming/pre-coding/antenna selection for the data, it is easy to incorporate that in the model. The principle of choosing appropriate pilot symbols for each user does not change. Also note that the number of CFOs is the same regardless of the number of antennas per user since there is only one local oscillator per terminal.

It is clear that the above system matrix A, which affects how well the CFOs can be estimated, depends on the combination of channel coefficients and pilot symbols. With conventional fixed pilot symbols, the system matrix A might become ill-conditioned for some channel realisations and hence it is difficult to accurately estimate the CFOs.

On the other hand, if the pilot symbols depend on the channel realisations $H_{n,m,k}$, they can be chosen to form a well-conditioned system matrix. This is possible if the access point knows the uplink channels, which is usually done by sounding. Note that this kind of communication between access point and terminals is already in place due to the uplink multiuser procedure.

Figure 6:
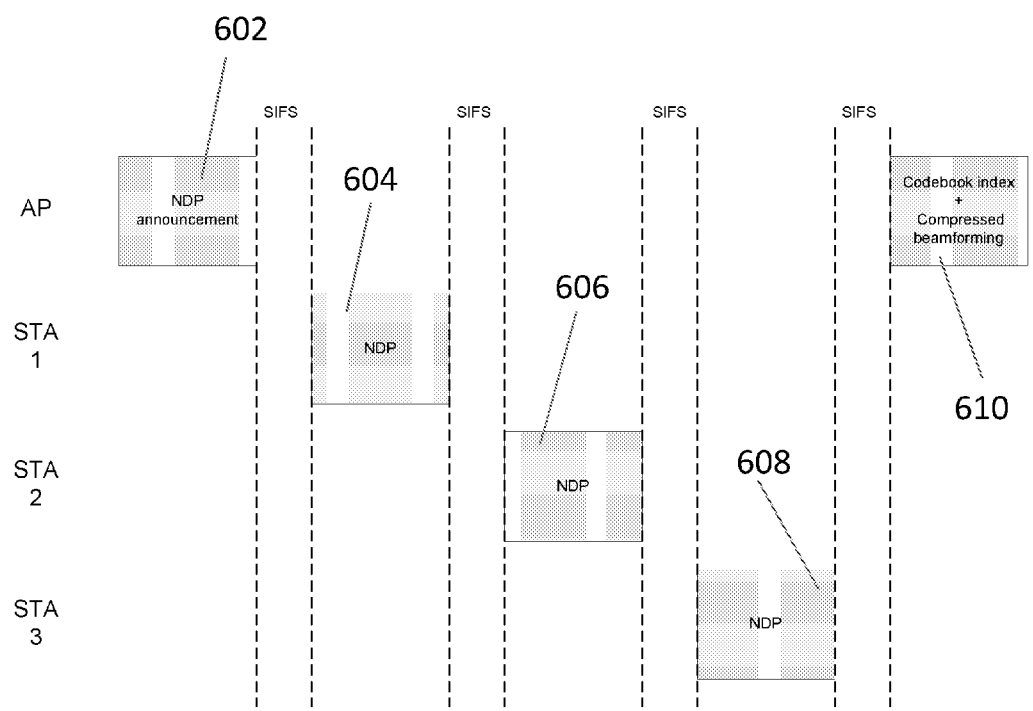
FIG. 6 shows a sounding procedure in an embodiment.

FIG. 6 shows the sounding procedure in an embodiment. The access point AP transmits a non-data packet announcement 602 to all of the users. In response to the non-data packet announcement 602, a first user STA1 waits for a short inter frame space (SIFS) and then transmits a non-data packet 604. This is followed by a second user STA2 waiting for a SIFS and then transmitting a non-data packet 606. A third user STA3 then waits for a SIFS and transmits a non-data packet 608. Once the access point AP has received non-data packets from each of the users, the access point determines pilot symbols for each of the users to use and also compressed beamforming for each of the users. This information is transmitted to the users as a codebook index and compressed beamforming 610. In this embodiment, the users have multiple antennas and therefore the access point AP transmits beamforming information to be used by the users when transmitting data to the access point in addition to the codebook index indicating the pilot symbols to be used for residual CFO tracking.

If a linear minimum mean square error (MMSE) estimator is deployed, the error covariance matrix is $$R_{ee} = \sigma_{\tilde{v}}^2 (A^H A + \sigma_{\tilde{v}}^2 I)^{-1}$$

$$e = y - \tilde{y} = y - (A^H A + \sigma_{\tilde{v}}^2 I)^{-1} A^H r$$

where $\sigma_{\tilde{v}}^2 = E\{|\tilde{v}_{n,p}|^2\}$ is the noise variance and I is the M×M identity matrix. By making the pilot symbols dependent on the channel $H_{n,m,p}$ the above can be minimised.

One technique is to define the objective function as the sum of all errors and then choose the pilot symbols from a codebook; the indices to the code words (which tells the terminals which pilot symbols to use) can be signalled with only a few bits, which keeps the feedback to a minimum.

Mathematically this is formulated as $$\min_{X_{m,p}} \sum_{m=1}^{M} R_{ee}(m, m)$$
$$\text{s.t.} X_{m,p} = C_{l_m, p}, \exists l_m \in \{0, \ldots, L-1\}$$

where $C_{l,p}$ is the codebook with L codewords.

Note that it is also possible to define the objective function in other ways, e.g., to minimise the largest individual error.

$$\min_{X_{m,p}} \max_{m} R_{ee}(m, m)$$
$$\text{s.t.} X_{m,p} = C_{l_m, p}, \exists l_m \in \{0, \ldots, L-1\}$$

For a small codebook, the error can be minimised by trying all $L^M$ combinations of codewords. The best choices $l_m$ are the signalled to the terminals, requiring a total of M $\log_2 L$ bits.

One choice of a codebook is based on the Fast Fourier Transform (FFT)

$$C_{p,l} = e^{\frac{j2\pi pl}{L}}$$
$$0 \leq p < P, 0 \leq l < L$$

However it should be noted that there are many other possible choices and that the proposed method works for any codebook. For example a Hadamard matrix codebook could also be used.

The specific embodiments are presented schematically. The reader will appreciate that the detailed implementation of each embodiment can be achieved in a number of ways. For instance, a dedicated hardware implementation could be designed and built. On the other hand, a processor could be configured with a computer program, such as delivered either by way of a storage medium (e.g. a magnetic, optical or solid state memory based device) or by way of a computer receivable signal (e.g. a download of a full program or a "patch" update to an existing program) to implement the management unit described above in relation to the embodiments. Besides these two positions, a multi-function hardware device, such as a DSP, a FPGA or the like, could be configured by configuration instructions.

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. A method of selecting a carrier frequency offset tracking pilot signal in an access point of a wireless network, the wireless network comprising the access point and a plurality of terminals, the method comprising:
   receiving, at a plurality of antennas of the access point, signals from each of the plurality of terminals;
   estimating, from the received signals, a spatial channel signature for each of the plurality of terminals;
   selecting, for each terminal of the plurality of terminals, the carrier frequency offset tracking pilot signal from a plurality of pre-coded pilot signals, which minimises a cost function that depends on the spatial tracking signature for each of the plurality of terminals and the carrier frequency offset tracking pilot signal; and
   transmitting an indication of the selected carrier frequency offset tracking pilot signals to the respective terminal.

2. A method according to claim 1, wherein the carrier frequency offset tracking pilot signal is selected from a codebook and the indication of the selected carrier frequency offset pilot signal comprises a codebook index.

3. A method according to claim 1, wherein the indication of the selected carrier frequency offset tracking pilot signals indicates weights for a plurality of subcarriers.

4. A method according to claim 1, wherein the cost function is the sum over all of the terminals of the errors in the residual carrier frequency offset with a linear estimator.

5. A method according to claim 1, wherein the cost function is the largest individual error in the carrier frequency offset over all of the terminals.

6. A method according to claim 1, further comprising receiving a data packet signal including the carrier frequency offset tracking pilot signals from the terminals, and estimating a residual carrier frequency offset from the carrier frequency offset tracking pilot signals.

7. A method according to claim 6, wherein the data packet signal including the carrier frequency offset tracking pilot signals further comprises a data signal, and the method further comprises:
   decoding the data signal using: the spatial channel signatures, the residual carrier frequency offset, and an initial carrier frequency offset estimated from the received signals.

8. A non-transitory computer readable medium carrying computer program instructions which when executed on a processor in an access point cause the access point to carry out a method of selecting a carrier frequency offset tracking pilot signal comprising:
   receiving, at a plurality of antennas of the access point, signals from each of the plurality of terminals;
   estimating, from the received signals, a spatial channel signature for each of the plurality of terminals;
   selecting, for each terminal of the plurality of terminals, the carrier frequency offset tracking pilot signal from a plurality of pre-coded pilot signals, which minimises a cost function that depends on the spatial tracking signature for each of the plurality of terminals and the carrier frequency offset tracking pilot signal; and
   transmitting an indication of the selected carrier frequency offset tracking pilot signals to the respective terminal.

9. An access point for selecting a carrier frequency offset tracking pilot signal in a wireless network, the wireless network comprising the access point and a plurality of terminals, the access point comprising:
   a plurality of antennas configured to receive signals from each of the plurality of terminals;
   a spatial channel estimator configured to estimate, from the received signals, a spatial channel signature for each of the plurality of terminals; and
   a pilot selector configured to select, for each terminal of the plurality of terminals, the carrier frequency offset tracking pilot signal for that terminal from a plurality of pre-coded pilot signals, which minimises a cost function that depends on the spatial tracking signature for each of the plurality of terminals and the carrier frequency offset tracking pilot signal.

10. An access point according to claim 9, further comprising storage for a codebook, the codebook comprising the plurality of pre-coded pilot signals.

11. An access point according to claim 9, further comprising a residual carrier frequency estimator configured to estimate a residual carrier frequency offset from carrier frequency offset tracking pilot signals received by antennas of the plurality of antennas from the terminals.

* * * * *